United States Patent
Harashima et al.

(10) Patent No.: US 8,459,134 B2
(45) Date of Patent: Jun. 11, 2013

(54) VEHICLE OIL PUMP

(75) Inventors: Terasu Harashima, Toyota (JP);
Atsushi Teshima, Toyota (JP);
Yoshihiko Sasaki, Okazaki (JP); Hiroshi Hamaguchi, Nishio (JP)

(73) Assignees: Toyota Jidosha Kabushiki Kaisha, Toyota-shi, Aichi-ken (JP); Aisin Aw Co., Ltd., Anjo-shi, Aichi-ken (JP)

( * ) Notice: Subject to any disclaimer, the term of this patent is extended or adjusted under 35 U.S.C. 154(b) by 253 days.

(21) Appl. No.: 13/080,798

(22) Filed: Apr. 6, 2011

(65) Prior Publication Data

US 2011/0252906 A1 Oct. 20, 2011

(30) Foreign Application Priority Data

Apr. 20, 2010 (JP) ................................. 2010-097440

(51) Int. Cl.
*F16H 3/08* (2006.01)

(52) U.S. Cl.
USPC .......................................................... 74/325

(58) Field of Classification Search
USPC ..................... 74/325, 665 F, 665 G, 665 GA
See application file for complete search history.

(56) References Cited

U.S. PATENT DOCUMENTS

| 2,193,524 | A | * | 3/1940 | Thompson | 477/142 |
| 2,584,032 | A | * | 1/1952 | Lapsley | 74/731.1 |
| 2,848,907 | A | * | 8/1958 | Wilson | 475/52 |
| 5,993,169 | A | | 11/1999 | Adachi et al. | |

FOREIGN PATENT DOCUMENTS

| JP | 7-167261 | 7/1995 |
| JP | 10-89446 | 4/1998 |
| JP | 10-115291 | 5/1998 |
| JP | 10-217787 | 8/1998 |

OTHER PUBLICATIONS

Notification of Reason(s) for Refusal for JP Appl. No. 2010-097440 dated Jan. 24, 2012.

* cited by examiner

*Primary Examiner* — Ha D Ho
(74) *Attorney, Agent, or Firm* — Finnegan, Henderson, Farabow, Garrett & Dunner, LLP

(57) ABSTRACT

A vehicle oil pump that is driven by a drive gear provided on a rotating shaft that rotates in one direction when a vehicle travels forward and rotates in the opposite direction when the vehicle travel backward includes a first driven gear that is in mesh with the drive gear and provided on a drive shaft of the vehicle oil pump via a first one-way clutch, an idler gear that is in mesh with the drive gear, and a second driven gear that is in mesh with the idler gear and provided on the drive shaft of the vehicle oil pump via a second one-way clutch. The first one-way clutch is configured to transmit rotation of the first driven gear to the drive shaft when the vehicle travels in one direction, from among forward and backward, and the second one-way clutch is configured to transmit rotation of the second driven gear to the drive shaft when the vehicle travels in the other direction, from among forward and backward.

5 Claims, 5 Drawing Sheets

VEHICLE OIL PUMP

INCORPORATION BY REFERENCE

The disclosure of Japanese Patent Application No. 2010-097440 filed on Apr. 20, 2010 including the specification, drawings and abstract is incorporated herein by reference in its entirety.

BACKGROUND OF THE INVENTION

1. Field of the Invention

The invention relates to an oil pump provided in a vehicle. More particularly, the invention relates to a vehicle oil pump that has a structure in which a drive gear that drives the oil pump rotates in one direction when the vehicle travels forward and rotates in the opposite direction when the vehicle travels backward.

2. Description of the Related Art

In a power transmitting apparatus provided in a vehicle, hydraulic pressure of oil supplied to lubricating mechanisms and clutches that are driven by hydraulic pressure is generated by an oil pump that is a hydraulic pressure generating mechanism. A related oil pump is configured to be driven by a rotating shaft that rotates in a certain direction, such as an output shaft of an engine, for example, so the oil pump is always driven in a certain direction. However, in an electric vehicle, for example, an electric motor that serves as a driving source rotates in one direction when the vehicle travels forward and rotates in the opposite direction when the vehicle travels backward. Therefore, when an oil pump is driven by a rotating shaft of the electric motor, the oil pump will end up rotating in the opposite direction when the vehicle travels backward, for example, and as a result, a sufficient amount of oil may not be able to be supplied when the vehicle travels backward. This problem is not limited to the electric vehicle described above. That is, with a structure in which an oil pump is driven by a rotating shaft that rotates in one direction when the vehicle travels forward and rotates in the opposite direction when the vehicle travels backward, such as an output shaft of a vehicular power transmitting apparatus, the necessary oil is unable to be supplied when the oil pump rotates in the opposite direction while the vehicle is traveling backward, for example.

Regarding this, Japanese Patent Application Publication No. 10-217787 (JP-A-10-217787) describes technology that always communicates an intake port with a tank, and a discharge port with an operating chamber of a hydraulic clutch, by switching the discharge port and the intake port using a switching valve that switches an oil passage according to the direction of travel of the vehicle, in a structure in which oil is discharged from an oil pump in one direction when the vehicle travels forward and is discharged from the oil pump in the opposite direction when the vehicle travels backward in a four-wheel-drive vehicle.

However, with the structure of the four-wheel-drive vehicle described in JP-A-10-217787, the need to provide the switching valve and the like complicates the structure and increases the number of parts, which in turn increases the manufacturing cost.

SUMMARY OF THE INVENTION

In view of this, the invention provides a vehicle oil pump that is driven by a rotating shaft that rotates in one direction when a vehicle travels forward and rotates in the opposite direction when the vehicle travels backward, and that has a simple structure and is able to supply oil regardless of whether the vehicle is traveling forward or backward.

A first aspect of the invention thus relates to a vehicle oil pump that is driven by a drive gear provided on a rotating shaft that rotates in one direction when a vehicle travels forward and rotates in the opposite direction when the vehicle travel backward. This vehicle oil pump includes a first driven gear that is in mesh with the drive gear and provided on a drive shaft of the vehicle oil pump via a first one-way clutch, an idler gear that is in mesh with the drive gear, and a second driven gear that is in mesh with the idler gear and provided on the drive shaft of the vehicle oil pump via a second one-way clutch. The first one-way clutch is configured to transmit rotation of the first driven gear to the drive shaft when the vehicle travels in one direction, from among forward and backward, and the second one-way clutch is configured to transmit rotation of the second driven gear to the drive shaft when the vehicle travels in the other direction, from among forward and backward.

According to the vehicle oil pump described above, when the vehicle travels in one direction, i.e., either forward or backward, for example, the vehicle oil pump is driven by the first driven gear rotating the drive shaft of the vehicle oil pump via the first one-way clutch. At this time, the second driven gear rotates in the opposite direction of the first driven gear, but this rotation is not transmitted to the drive shaft because the second one-way clutch rotates idly. Also, when the vehicle travels in the other direction, i.e., either forward or backward, for example, the vehicle oil pump is driven by the second driven gear rotating the drive shaft of the vehicle oil pump via the second one-way clutch. At this time, the first driven gear rotates in the opposite direction of the second driven gear, but this rotation is not transmitted to the drive shaft because the first one-way clutch rotates idly. Here, the second driven gear is in mesh with the drive gear via the idler gear, so the rotational direction of the first driven gear when the vehicle travels forward is the same as the rotational direction of the second driven gear when the vehicle travels backward. As a result, the drive shaft of the oil pump rotates in the same direction when the vehicle travels backward as it does when the vehicle travels forward. Therefore, the vehicle oil pump is able to pump oil in the same direction regardless of whether the vehicle is traveling forward or backward, so oil can be supplied to portions of the vehicle requiring hydraulic pressure regardless of the direction in which the vehicle is traveling. Also, there is no need for a special switching mechanism or the like that switches the oil passage according to the direction in which the vehicle is traveling and the like, so the apparatus can be simplified, and in turn, the manufacturing cost can be reduced.

Also, in the vehicle oil pump described above, the first one-way clutch may be configured to transmit the rotation of the first driven gear to the drive shaft when the vehicle travels forward, the second one-way clutch may be configured to transmit the rotation of the second driven gear to the drive shaft when the vehicle travels backward and a radius of a pitch circle of the second driven gear may be designed to be smaller than the radius of the pitch circle of the first driven gear.

According to the vehicle oil pump described above, the radius of the pitch circle of the second driven gear is designed to be smaller than the radius of the pitch circle of the first driven gear, so even if the rotation speed of the drive gear is the same, the rotation speed of the drive shaft is relatively faster, and thus the discharge flowrate from the oil pump is relatively higher, when the vehicle is traveling backward than it is when the vehicle is traveling forward. As a result, oil is able to be effectively supplied when the vehicle is traveling backward at a comparatively low vehicle speed in which lubricating oil is especially necessary.

Also, in the vehicle oil pump described above, a face width of the drive gear may be larger than the face width of the first driven gear and the face width of the idler gear, and the first driven gear and the idler gear may be in mesh with the drive gear.

According to the vehicle oil pump described above, having the face width of the drive gear be larger than the face width of the first driven gear and the face width of the idler gear, and the first driven gear and the idler gear be in mesh with the drive gear makes it is possible to inhibit the number of parts from increasing when making the invention.

Also, in the vehicle oil pump described above, the face width of the drive gear may be larger than the sum of the face width of the first driven gear and the face width of the idler gear.

According to the vehicle oil pump described above, the face width of the drive gear is larger than the sum of the face width of the first driven gear and the face width of the idler gear, so the first driven gear and the idler gear are able to reliably be in mesh with the drive gear. As a result, torque is able to be reliably transmitted among gears, and the number of parts is able to be inhibited from increasing when making the invention.

In addition, in the vehicle oil pump described above, the drive gear, the idler gear, and the second driven gear may be arranged such that a triangle is formed when an axis of the drive gear, an axis of the idler gear, and an axis of the second driven gear are connected together.

According to the vehicle oil pump described above, arranging the drive gear, the idler gear, and the second driven gear so that their axes are not in a straight line, as described above, makes it possible to inhibit the drive apparatus from expanding in the radial direction compared with when the axes of the drive gear, the idle gear, and the second driven gear are arranged in a straight line.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Here, the invention may be applied to an electric vehicle, for example. In the electric vehicle, the rotational direction of an electric motor that functions as a driving source changes according to the direction of travel of the vehicle. Therefore, the rotational direction of a drive gear that drives a vehicle oil pump also changes according to the direction of travel of the vehicle. Regarding this, applying the invention makes it possible to supply oil to portions that require oil in a vehicular power transmitting apparatus regardless of whether the direction of travel of the vehicle is forward or backward.

Also, an inner rotor of the vehicle oil pump is provided on a drive shaft that drives the vehicle oil pump. Therefore, when this drive shaft is rotated via a drive gear and a driven gear, the inner rotor is rotated and the oil pump is driven.

Hereinafter, example embodiments of the invention will be described in detail with reference to the accompanying drawings. Incidentally, the drawings described in the example embodiments below have been simplified or modified as appropriate, so the scale ratios and the shapes and the like of the portions are not always accurately depicted.

Figure 1:
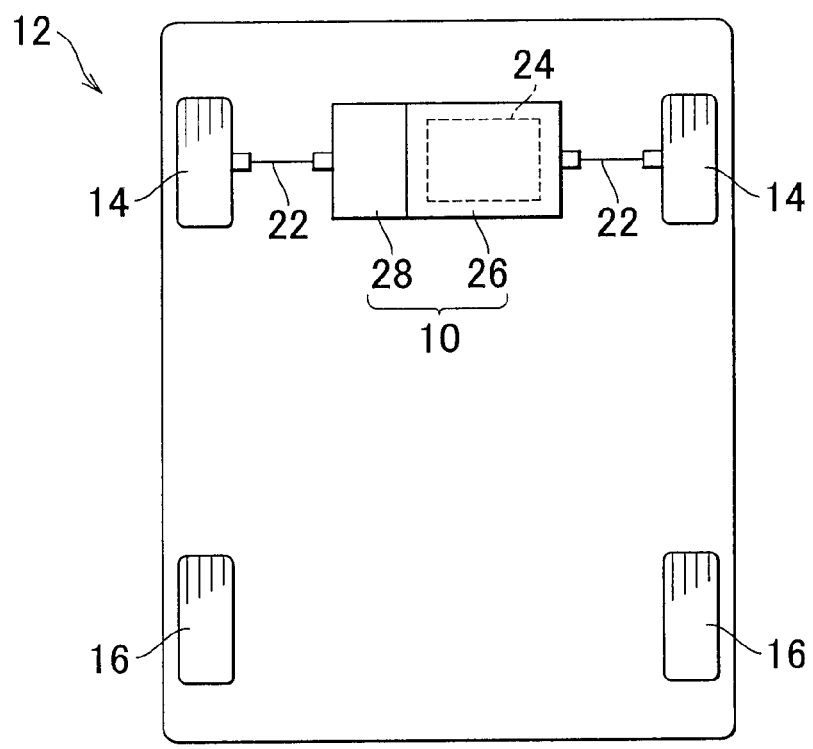
FIG. 1 is a view schematically showing the structure of a drive-train of a vehicle provided with a vehicular power transmitting apparatus having a vehicle oil pump according to one example embodiment of the invention.
Figure 2:
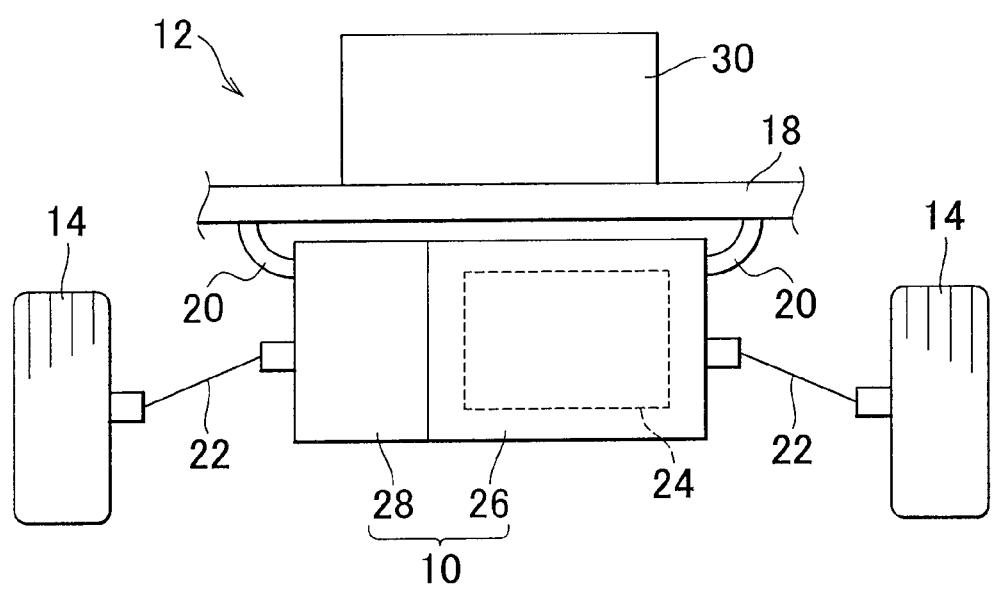
FIG. 2 is a view schematically showing the structure of the drive-train viewing the vehicular power transmitting apparatus from the rear of the vehicle shown in FIG. 1.

FIG. 1 is a view schematically showing the structure of a drive-train of a vehicle 12 provided with a vehicular power transmitting apparatus 10 according to one example embodiment of the invention. Also, FIG. 2 is a view schematically showing the structure of the drive-train viewing the vehicular power transmitting apparatus 10 from the rear of the vehicle 12. As shown in FIGS. 1 and 2, the vehicle 12 includes a pair of right and left front wheels 14 provided at the front of the vehicle 12 and a pair of right and left rear wheels 16 provided at the rear of the vehicle 12, and the vehicular power transmitting apparatus 10 that is fixed to a vehicle body 18 at the front of the vehicle 12 via mount members 20, as shown in FIG. 2, and drives (i.e., rotates) the pair of front wheels 14 via a pair of left and right drive shafts (i.e., axles) 22.

The vehicular power transmitting apparatus 10 is provided with a driving portion 26 that includes an electric motor 24 that functions as a driving source of the vehicle 12 and is transverse mounted in the vehicle 12, and a transaxle portion 28 that functions as a power transmitting apparatus that distributes rotation output from the driving portion 26 to the pair of left and right drive shafts 22 while reducing that rotation. The electric motor 24 is operated by a driving current supplied from an inverter 30 arranged on the vehicle body 18, for example. The vehicle 12 is an FF (Front motor, Front Drive) type electric vehicle in which the front wheels 14 that serve as driving wheels are driven (i.e., rotated) by the electric motor 24 arranged at the front of the vehicle 12.

Figure 3:
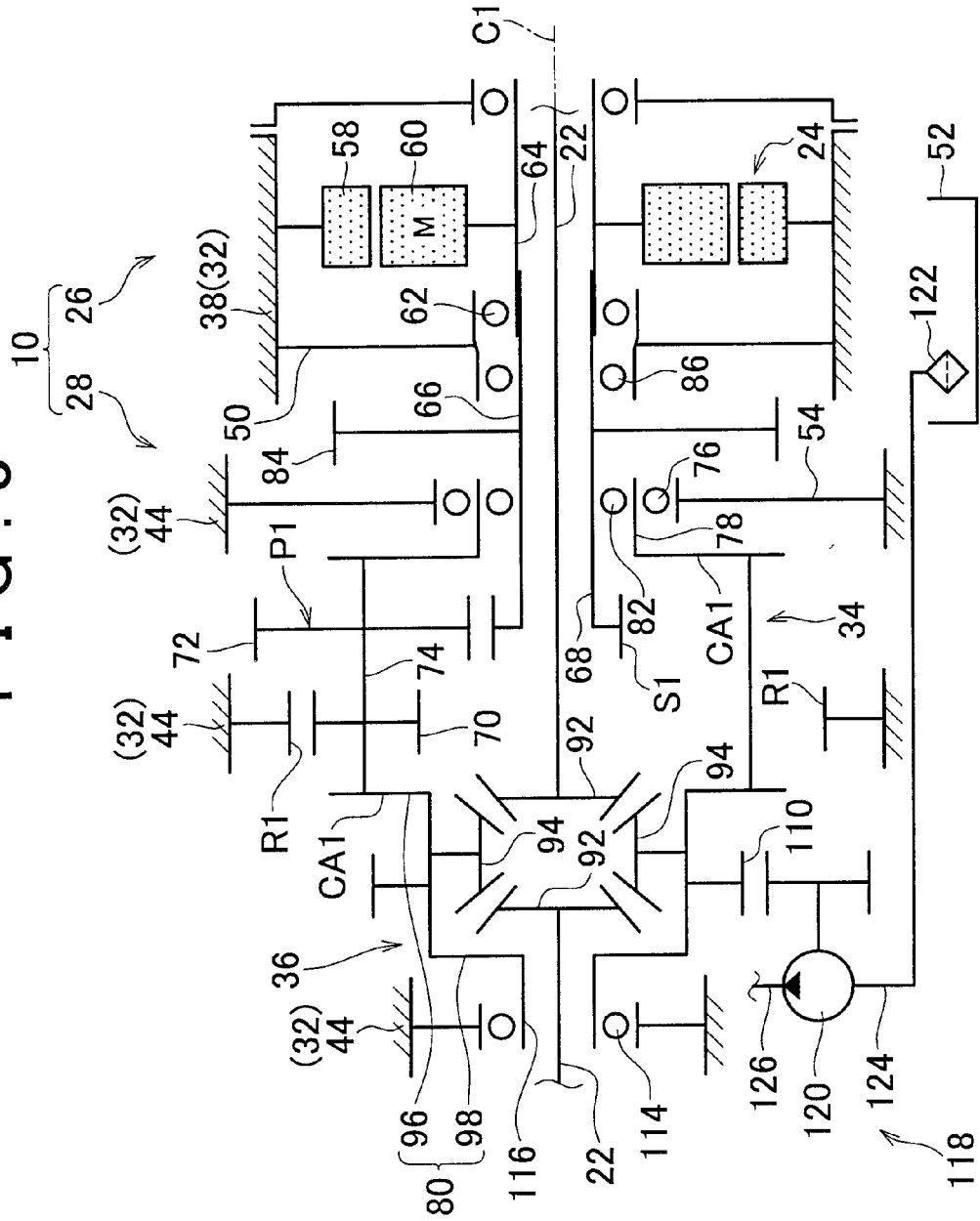
FIG. 3 is a skeleton view of the structure of the vehicular power transmitting apparatus in FIG. 1.
Figure 4:
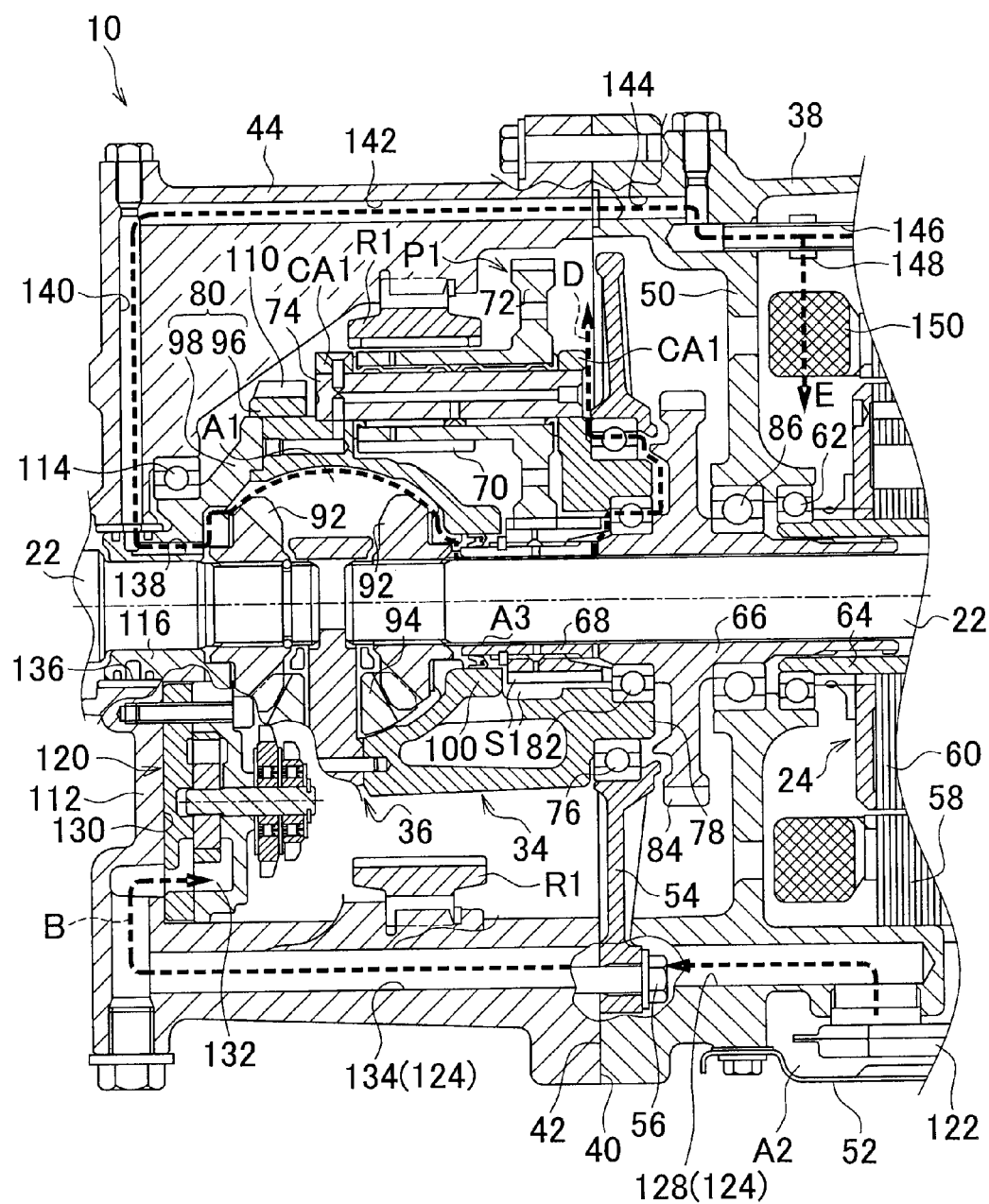
FIG. 4 is a detailed longitudinal sectional view of the structure of the vehicular power transmitting apparatus in FIG. 1.

FIG. 3 is a skeleton view of the structure of the vehicular power transmitting apparatus 10 in FIG. 1. Also, FIG. 4 is a detailed longitudinal view of the vehicular power transmitting apparatus 10. As shown in FIGS. 3 and 4, the vehicular power transmitting apparatus 10 includes the electric motor 24, a reduction gear 34, and a differential gear unit 36 all housed inside a transaxle case 32 and arranged on a common axis C1. The driving portion 26 is formed mainly by the electric motor 24, and the transaxle portion 28 is formed mainly by the reduction gear 34 and the differential gear unit 36.

The transaxle case 32 includes a cylindrical case 38 that mainly houses the electric motor 24, and a closed-end cylindrical case 44 that mainly houses the reduction gear 34 and the differential gear unit 36, and in which an opening surface 40 is fastened together with one opening surface 42 of the cylindrical case 38 by bolts, not shown, for example. An annular plate-shaped partition wall 50 is integrally formed on an end portion of the cylindrical case 38 that is on the closed-end cylindrical case 44 side, so as to protrude from an inner peripheral surface of the cylindrical case 38 toward the inner peripheral side. Also, an oil pan 52 is fixed at an open portion formed in a lower surface of the cylindrical case 38 so as to close off that opening. This oil pan 52 functions as an oil receiver that catches lubricating oil that flows back to the lower portion of the cylindrical case 38 after having circulated through the transaxle case 32. Also, an annular plate-shaped supporting wall 54 is fixed to the opening surface 40 of the closed-end cylindrical case 44 by a bolt 56 or the like, for example. The cylindrical case 38, the closed-end cylindrical case 44, and the supporting wall 54 are aluminum alloy die cast, for example.

The electric motor 24 includes a stator 58 that is integrally fixed to the cylindrical case 38 by a bolt or the like, not shown, for example, a rotor 60 that is arranged on an inner peripheral side of the stator 58, and a cylindrical output shaft 64 that is connected to an inner peripheral surface of the rotor 60 and rotatably supported via a bearing 62 and the like fitted to an inner peripheral end of the partition wall 50. The cylindrical output shaft 64 is driven (i.e., rotated) according to a driving current supplied from the inverter 30 to the stator 58. The electric motor 24 structured in this way is connected to an input shaft 66 of the reduction gear 34 that is connected downstream (in terms of the flow of power) of the electric motor 24, and drives (i.e., rotates) the input shaft 66.

The reduction gear 34 is a planetary gear type reduction gear that includes the cylindrical input shaft (i.e., a second power transmitting member) 66, a sun gear S1, a stepped pinion P1, a carrier (i.e., a first power transmitting member) CA1, and a ring gear R1. The input shaft (i.e., the second power transmitting member) 66 is provided on an outer peripheral side of the one drive shaft 22 and connected to the output shaft 64 of the electric motor 24 by spline engagement, for example, so as to be unable to rotate relative to the output shaft 64. The sun gear S1 is engaged with a shaft end portion 68 of the input shaft 66 on the side opposite the electric motor 24, i.e., on the differential gear unit 36 side, by spline engagement, for example, so as to be unable to rotate relative to the shaft end portion 68. The stepped pinion P1 has a small diameter portion 70 and a large diameter portion 72, and the large diameter portion 72 is in mesh with the sun gear S1. The carrier (i.e., the first power transmitting member) CA1 rotatably supports the stepped pinion P1 via a pinion shaft 74, while also enabling the stepped pinion P1 to revolve around the sun gear S1. The ring gear R1 is concentric with the sun gear S1 and fixed to the closed-end cylindrical case 44 so as to be unable to rotate relative to the closed-end cylindrical case 44, and is in mesh with the small diameter portion 70 of the stepped pinion P1. Incidentally, the carrier CA1 corresponds to any one of a plurality of rotating elements that form the reduction gear.

The carrier CA1 has a cylindrical shaft end portion 78 that is rotatably supported about the axis C1 via a first bearing 76 on an inner peripheral side of a non-rotating supporting wall 54. Also, the carrier CA1 is connected to a differential case 80 of the differential gear unit 36 arranged downstream (in terms of the flow of power) of the reduction gear 34, and functions as an output member of the reduction gear 34. The reduction gear 34 structured in this way reduces the rate of the rotation input from the electric motor 24 to the input shaft 66, and outputs the rotation at the reduced rate to the differential gear unit 36.

The input shaft 66 is supported by the shaft end portion 78 at the inside via a second bearing 82 that overlaps in the radial direction with the first bearing 76, and provided concentric with respect to the carrier CA 1 and unable to rotate relative to the carrier CA1. Also, a disc-shaped parking lock gear 84 that extends in the radial direction and has outer peripheral teeth formed on an outer peripheral end thereof is formed on the input shaft 66. Also, the input shaft 66 is rotatably supported via a third bearing 86 that is fitted to an inner peripheral end of the partition wall 50.

The differential gear unit 36 is formed by a split differential case (i.e., a differential case with two halves) 80, a pair of side gears 92 that oppose one another on the axis C1 inside the differential case 80, and three pinions 94 that are all arranged equidistantly in the circumferential direction between the side gears and in mesh with the pair of side gears 92. The differential gear unit 36 is provided adjacent to the input shaft 66 on the side opposite the electric motor 24 in the axial direction.

The differential case 80 is formed of a cylindrical first differential case 96 that is arranged on the side of the electric motor 24 in the axial direction, and a cylindrical second differential case 98 that is arranged on the side of the cylindrical first differential case 96 opposite the electric motor 24 and fastened together with the first differential case 96 with bolts, not shown, for example. The differential case 80 is provided so as to be able to rotate about the axis C1.

The first differential case 96 is integrally provided with the carrier CA1, and rotatably supported about the axis C1 via the carrier CA1 and the first bearing 76. The rotation output from the reduction gear 34 is input to the first differential case 96 through the carrier CA 1. The first differential case 96 is also an input member of the differential gear unit 36. Also, a drive gear 110 for driving (i.e., rotating) driven gears 168 and 172 of an oil pump 120 that will be described later is continuously formed in the circumferential direction either separately or integrally on the first differential case 96 that is one example of a rotating shaft of the invention. Furthermore, a first cylindrical end portion (i.e., a cylindrical end portion) 100 that extends toward the outer peripheral side of the shaft end portion 68 of the input shaft 66 is formed on the first differential case 96.

The second differential case 98 is rotatably supported about the axis C1 via a differential side bearing 114 that is fitted to an inner peripheral side of an annular plate-shaped bottom wall 112 of the closed-end cylindrical case 44. Also, the second differential case 98 includes a second cylindrical end portion 116 that protrudes out toward the side opposite the first differential case 96 and is provided with an annular groove 136 and a second discharge oil passage 138 that form part of a lubricating oil supply mechanism 118 that will be described later.

A shaft end portion of the one drive shaft 22 is connected to an inner peripheral side of the side gear 92 on the side of the electric motor 24, from among the pair of side gears 92, by spline engagement, for example, so as to be unable to rotate relative to the side gear 92. Also, a shaft end portion of the other drive shaft 22 is connected to an inner peripheral side of the side gear 92 on the side opposite the electric motor 24, from among the pair of side gears 92, by spline engagement, for example, so as to be unable to rotate relative to the side gear 92. The one drive shaft 22 is rotatably supported about the axis C1 by the inner peripheral surface of the input shaft 66, for example, and the other drive shaft 22 is rotatably supported about the axis C1 by the inner peripheral surface of the second cylindrical end portion 116 of the second differential case 98.

The differential gear unit 36 structured in this way transmits driving force to the pair of drive shafts 22 arranged on the axis C1 by being driven, i.e., rotated, by the reduction gear 34, while allowing for rotational difference between the drive shafts 22.

As shown in FIG. 3, the vehicular power transmitting apparatus 10 includes the lubricating oil supply mechanism 118 for supplying lubricating oil to each portion that needs lubricating (hereinafter referred to as a "lubrication portion") such as between two members that rotate relative to one another and intermeshing portions of gears, for example, of the differential gear unit 36, the reduction gear 34, and the electric motor 24 structured as described above. This lubricating oil supply mechanism 118 is formed by an internal gear type oil pump 120 fixed to a bottom surface on the inside of the bottom wall 112 of the closed-end cylindrical case 44, an intake oil passage 124 for leading lubricating oil stored in the oil pan 52 to the oil pump 120 via a strainer 122, and a discharge oil passage 126 that has multiple branches along the way for leading lubricating oil that has been drawn into the oil pump 120 via the intake oil passage 124 and pressurized to each of the lubrication portions. This oil pump 120 is one example of the vehicle oil pump of the invention.

As shown in FIG. 4, the intake oil passage 124 is formed from a first intake oil passage 128 and a second intake oil passage 134. The first intake oil passage 128 is communicated via the strainer 122 with a lubricating oil storage space A2 formed by the oil pan 52 and an open portion in a lower surface of the cylindrical case 38, and opens to one opening surface 42 of the cylindrical case 38. The second intake oil passage 134 is opposite the first intake oil passage 128 and opens to the opening surface 40 of the closed-end cylindrical case 44, and is communicated with the first intake oil passage 128. This second intake oil passage 134 is also communicated with a pump chamber pump chamber 132 of the oil pump 120 through an opening in the bottom surface of a recessed receiving portion 130 formed on the inside of the bottom wall 112 of the closed-end cylindrical case 44. This intake oil passage 124 is an oil passage for supplying lubricating oil from the lubricating oil storage space A2 to the oil pump 120 via the strainer 122, the first intake oil passage 128, and the second intake oil passage 134, as shown by the broken arrow B in FIG. 4.

The discharge oil passage 126 includes a first discharge passage, not shown, the annular groove 136, the second discharge oil passage 138, a differential case internal space A1, and a cylindrical space A3. The first discharge passage, not shown, is communicated with the pump chamber 132 of the oil pump 120 through an opening in the bottom surface of the recessed receiving portion 130, and is also communicated with the annular groove 136 formed on an outer peripheral surface of the oil discharge passage 116 of the second differential case 98. The second discharge oil passage 138 is formed in the oil discharge passage 116 for communicating the annular groove 136 with the differential case internal space A1. The cylindrical space A3 is formed between the input shaft 66 and the one drive shaft 22 and is communicated with the differential case internal space A1. Moreover, the discharge oil passage 126 includes a radial oil passage 140, an axial oil passage 142, a connecting oil passage 144, and an oil passage pipe 146. The radial oil passage 140 is formed vertically above the bottom wall 112 of the closed-end cylindrical case 44 and is communicated with the annular groove 136 through an opening on the inner peripheral side. The axial oil passage 142 is formed parallel to the axis C1 in a vertically upper portion of the closed-end cylindrical case 44, is communicated with the radial oil passage 140 at one end in the axial direction, and is communicated with the connecting oil passage 144 of the cylindrical case 38 that will be described later at the other end. The connecting oil passage 144 is formed in the cylindrical case 38, is communicated with the axial oil passage 142 at one end, and is communicated with the oil passage pipe 146 that passes vertically above the electric motor 24 at the other end.

Some of the lubricating oil in the discharge oil passage 126 is supplied from the pump chamber 132 of the oil pump 120 to the cylindrical space A3 through the first discharge oil passage, the annular groove 136, the second discharge oil passage 138, and the differential case internal space A1, as shown by the broken arrow D in FIG. 4. This lubricating oil is then supplied from the cylindrical space A3 to the second bearing 82, thereby lubricating the second bearing 82. Moreover, after lubricating the second bearing 82, the lubricating oil is supplied to the first bearing 76, thereby lubricating the first bearing 76.

Also, some of the lubricating oil in the discharge oil passage 126 is supplied from the pump chamber 132 of the oil pump 120 through the first discharge oil passage, the annular groove 136, the radial oil passage 140, the axial oil passage 142, the connecting oil passage 144, and the oil passage pipe 146 to a coil end 150 of the electric motor 24 from a bleed hole 148 formed in the oil passage pipe 146, as shown by arrow E in FIG. 4. As a result, the coil end 150 is cooled by the lubricating oil.

Figure 5:
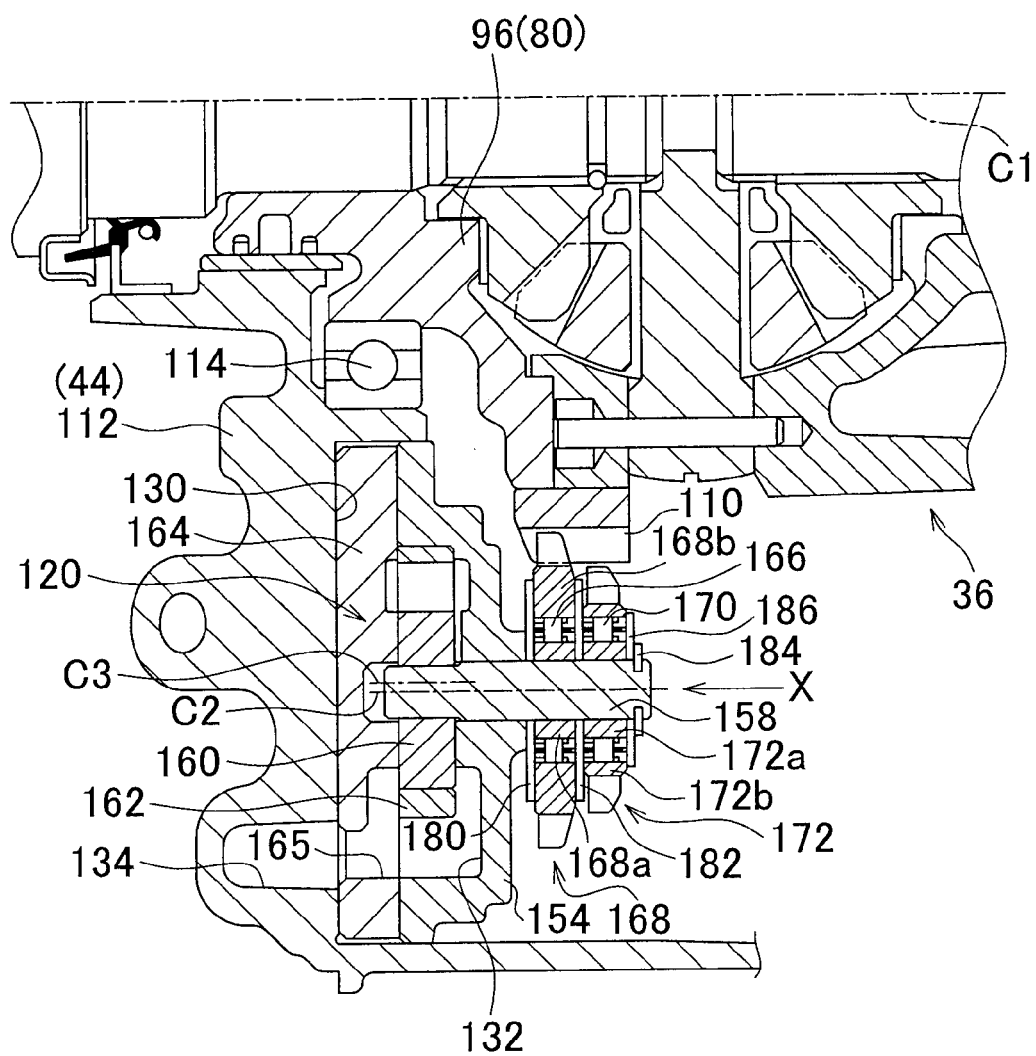
FIG. 5 is an enlarged sectional view of the oil pump shown in FIG. 4 and the peripheral members including the oil pump.

Next, the structure of the oil pump 120 that is the main part of the invention will be described with reference to FIGS. 5 and 6. FIG. 5 is an enlarged sectional view of the oil pump 120 shown in FIG. 4 and the area there around. Incidentally, in FIG. 5, portions that have been cut at the position where the drive gear 110 and a first driven gear 168 that will be described later mesh are shown expanded in a plan view.

As shown in FIG. 5, the oil pump 120 is provided adjacent to the bottom surface of the recessed receiving portion 130 of the closed-end cylindrical case 44. The oil pump 120 includes a short cylindrical pump body 154, a pump shaft 158, an inner rotor 160, an outer rotor 162, and a pump cover 164. The pump body 154 has the pump chamber 132 that is connected to the first discharge oil passage formed in it. The pump shaft 158 is rotatably supported by the pump body 154 and the pump cover 164 that will be described later while passing through the pump body 154. The inner rotor 160 is fitted onto one end portion of the pump shaft 158 so as to be unable to rotate relative to the pump shaft 158, while being provided concentric with the pump shaft 158. This inner rotor 160 is driven (i.e., rotated) together with the pump shaft 158 about an axis C2 that is parallel to the axis C1. The outer rotor 162 is fitted into the pump chamber 132 so as to be able to rotate about an axis C3 that is offset from the axis C2, while being in mesh with the inner rotor 160. The pump cover 164 is arranged between the pump body 154 and the bottom wall 112 of the closed-end cylindrical case 44 inside the recessed receiving portion 130, and fixed to the pump body 154 such that the inner rotor 160 and the outer rotor 162 are unable to come out of the pump chamber 132. The pump shaft 158 is one example of the drive shaft of the invention. The pump body 154 and the pump cover 164 are aluminum alloy die cast, for example, and the inner rotor 160 and the outer rotor 162 are molded by sintering (powder metallurgy), for example. Also, the pump cover 164 has communicating holes 165 that communicate the pump chamber 132 of the pump body 154 with both the first discharge oil passage and the second intake oil passage 134 through an opening in the bottom surface of the recessed receiving portion 130.

The oil pump 120 also has a first driven gear 168, a second driven gear 172, and an idler gear 188 that will be described later, as a pump driving mechanism (i.e., a hydraulic pressure generating mechanism) that drives the pump shaft 158 of the oil pump 120. The first driven gear 168 is provided on the pump shaft 158 via a first one-way clutch 166 and is in mesh with the drive gear 110 at the other end portion of the pump shaft 158. The second driven gear 172 is arranged in line with the first driven gear 168 in the axial direction and is provided on the pump shaft 158 via a second one-way clutch 170. The idler gear 188 that will be described later meshes with the drive gear 110. Incidentally, the first one-way clutch 166 is one example of the first one-way clutch of the invention, the first driven gear 168 is one example of the first driven gear of the invention, the second one-way clutch 170 is one example of the second one-way clutch of the invention, and the second driven gear 172 is one example of the second driven gear of the invention.

A washer 180 that is adjacent to an end surface of the pump body 154 is interposed between the pump body 154 and the first driven gear 168. This washer 180 determines the position of the first driven gear 168 in the axial direction and enables the pump body 154 and the first driven gear 168 to rotate relative to one another. Also, a washer 182 is interposed between the first driven gear 168 and the second driven gear 172. This washer 182 enables the first driven gear 168 and the second driven gear 172 to rotate relative to one another. Moreover, an annular snap ring 184 is fitted so as to be unable to move in the axial direction on the side opposite the inner rotor 160 in the axial direction of the pump shaft 158. The position of the second driven gear 172 in the axial direction is determined by the second driven gear 172 being adjacent to a washer 186 that is adjacent to that snap ring 184. That is, the snap ring 184 both prevents the first driven gear 168 and the second driven gear 172 from slipping off of the pump shaft 158, and determines the positions of those gears in the axial position. Also, the first driven gear 168 that is larger in diameter than the second driven gear 172 is arranged on the pump body 154 side in the axial direction, and the second driven gear 172 is arranged on the side away from the pump body 154. Arranging the first driven gear 168 and the second driven gear 172 in this way reduces the load on the pump shaft 158 that supports the first driven gear 168 and the second driven gear 172 in a cantilever state. Also, the vehicle travels forward more frequently than it travels backward, which means that torque is more frequently transmitted to the pump shaft 158 from the first driven gear 168 side. Even so, with the structure described above, the distance between the inner rotor 160 and the first driven gear 168 of the oil pump 120 in the axial direction is short, so the effect from torsion of the pump shaft 158 when torque is transmitted is reduced.

Outer peripheral teeth on the first driven gear 168 are in mesh with outer peripheral teeth of the drive gear 110, so the first driven gear 168 rotates as the drive gear 110 rotates. Also, the first driven gear 168 is connected to the pump shaft 158 via the first one-way clutch 166, and as a result, transmits only the rotation of the first driven gear 168 when the vehicle travels forward to the pump shaft 158. More specifically, the first one-way clutch 166 is built into the first driven gear 168, and the first driven gear 168 is divided into a first inner race 168a and a first outer race 168b that sandwich the first one-way clutch 166. When the first outer race 168b of the first driven gear 168 rotates in a direction that corresponds to when the vehicle travels forward, that rotation is transmitted to the first inner race 168a via the first one-way clutch 166. Incidentally, the first inner race 168a is fit onto the pump shaft 158 by a key or the like so as to be unable to rotate relative to the pump shaft 158. As a result, rotation of the first driven gear 168 is transmitted to the pump shaft 158. On the other hand, when the vehicle travels backward, the drive gear 110 rotates in the opposite direction so the first outer race 168b rotates in the direction opposite the direction in which it rotates when the vehicle travels forward. However, at this time, the first one-way clutch 166 rotates idly so the rotation of the first outer race 168b is not transmitted to the first inner race 168a.

Outer peripheral teeth of the second driven gear 172 are in mesh with the outer peripheral teeth of the drive gear 110 via the idler gear 188 that will be described later, so the second driven gear 172 rotates as the drive gear 110 rotates. Also, the second driven gear 172 is connected to the pump shaft 158 via the second one-way clutch 170, and as a result, transmits only the rotation of the second driven gear 172 when the vehicle travels backward to the pump shaft 158. More specifically, the second one-way clutch 170 is built into the second driven gear 172, and the second driven gear 172 is divided into a second inner race 172a and a second outer race 172b that sandwich the second one-way clutch 170. When the second outer race 172b of the second driven gear 172 rotates in a direction that corresponds to when the vehicle travels backward, that rotation is transmitted to the second inner race 172a via the second one-way clutch 170. Incidentally, the second driven gear 172 is fit onto the pump shaft 158 by a key or the like so as to be unable to rotate relative to the pump shaft 158. As a result, rotation of the second driven gear 172 is transmitted to the pump shaft 158. On the other hand, when the vehicle travels forward, the drive gear 110 rotates in the opposite direction so the second outer race 172b rotates in the direction opposite the direction in which it rotates when the vehicle travels backward. However, at this time, the second one-way clutch 170 rotates idly so the rotation of the second outer race 172b is not transmitted to the second inner race 172a.

Figure 6:
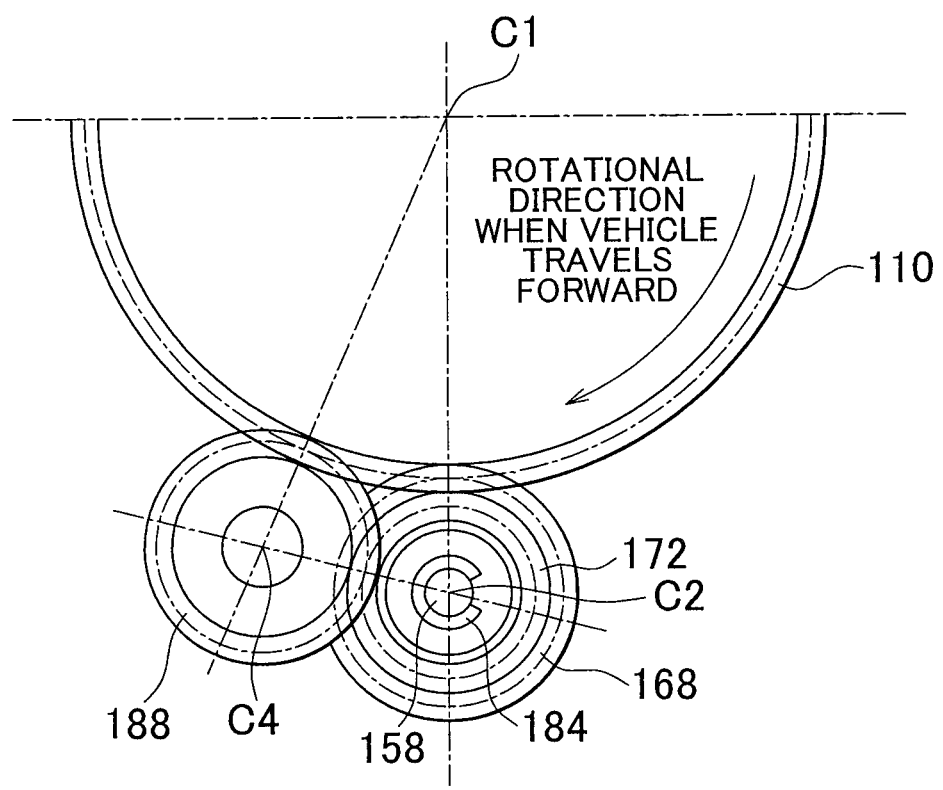
FIG. 6 is a simplified view of the intermeshing state of a drive gear and a first driven gear and a second driven gear in the sectional view of FIG. 5.

FIG. 6 is a simplified view of the intermeshing state of the drive gear 110 and the first driven gear 168 and the second driven gear 172 in the sectional view of FIG. 5. Incidentally, FIG. 6 corresponds to an arrow view of the member as viewed from the direction of arrow X. In FIG. 6, the largest diameter arc represents the drive gear 110 that rotates about the axis C1. The solid line on the outer peripheral side represents the addendum circle, the solid line on the inner peripheral side represents the root (dedendum) circle, and the alternate long and short dash line in between those solid lines represents the pitch circle.

Of the plurality of circles drawn around the axis C2, the alternate long and short dash line represents the pitch circle of the first driven gear 168, the solid line on the outer peripheral side of that pitch circle (i.e., the outermost peripheral circle) represents the addendum circle of the first driven gear 168, and the solid line on the inner peripheral side of that pitch circle represents the root (dedendum) circle of the first driven gear 168. Also, the alternate long and two short dashes line represents the pitch circle of the second driven gear 172, the solid line on the outer peripheral side of that pitch circle represents the addendum circle of the second driven gear 172, and the solid line on the inner peripheral side of that pitch circle represents the root (dedendum) circle of the second driven gear 172. Also, the smallest diameter circle represents the pump shaft 158.

Also, the idler gear 188 is provided rotatably supported about an axis C4 that is offset with respect to the axis C2. In the idler gear 188, the alternate long and short dash line represents the pitch circle of the idler gear 188, the outer peripheral circle indicated by a solid line represents the addendum circle of the idler gear 188, and the solid line on the inner peripheral side of the pitch circle represents the root (dedendum) circle of the idler gear 188. Incidentally, the idler gear 188 is rotatably supported by a bearing, not shown, at one or both ends. As shown in FIG. 6, the radius (i.e., the effective radius) of the pitch circle of the second driven gear 172 is designed to be smaller than the radius (i.e., the effective radius) of the pitch circle of the first driven gear 168.

Also, as shown in FIG. 6, the drive gear 110 and the first driven gear 168 are in constant mesh. Also, the drive gear 110 and the idler gear 188 are in constant mesh, and moreover, the idler gear 188 is in constant mesh with the second driven gear 172. Interposing the idler gear 188 between the drive gear 110 and the second driven gear 172 in this way means that the first driven gear 168 and the second driven gear 172 will always rotate in opposite directions. Also, the drive gear 110, the idler gear 188, and the second driven gear 172 are arranged such that when the axis C1 of the drive gear 110, the axis C4 of the idler gear 188, and the axis C2 of the second driven gear 172 are connected, a triangle is formed (a generally isosceles triangle in this example embodiment). As a result, expansion in the radial direction is suppressed compared with when the drive gear 110, the idler gear 188, and the second driven gear 172 are arranged in a straight line.

Although not shown in FIG. 5, the drive gear 110, the idler gear 188, and the second driven gear 172 are arranged in overlapping positions in the axial direction in FIG. 5. That is, as shown in FIG. 6, the drive gear 110, the idler gear 188, and the second driven gear 172 are arranged in overlapping positions in the axial direction due to the idler gear 188 being arranged about the axis C4 that is offset with respect to the axis C2. Also, as shown in FIG. 5, the first driven gear 168 and the idler gear 188 are both able to be in mesh with the drive gear 110 by configuring the face width of the drive gear 110 to be larger than the sum of the face width of the first driven gear 168 and the face width of the idler gear 188. As a result, the first driven gear 168 and the idler gear 188 are able to be in mesh with the drive gear 110 simultaneously simply by extending the face width of the drive gear 110, so an increase in the number of parts can be suppressed.

With the structure described above, the pump shaft 158 rotates in one direction and the oil pump 120 discharges lubricating oil to the discharge oil passage 126 side irrespective of whether the vehicle is traveling forward or backward. Hereinafter, the operation of the oil pump 120 will be described. Incidentally, in this example, as shown in FIG. 6, when the drive gear 110 rotates clockwise, it is understood that the vehicle is traveling forward. It also is understood that the oil pump 120 is designed to draw in oil from the intake oil passage 124 and discharge oil to the discharge oil passage 126 when the pump shaft 158 rotates counterclockwise in FIG. 6.

In FIG. 6, when the drive gear 110 rotates clockwise by the vehicle traveling in the forward direction, the first driven gear 168 rotates counterclockwise. Also, the idler gear 188 is also made to rotate counterclockwise by the drive gear 110, so the second driven gear 172 that is in mesh with the idler gear 188 is made to rotate clockwise. At this time, rotation of the first driven gear 168 in the counterclockwise direction that corresponds to when the vehicle is traveling forward is transmitted to the pump shaft 158 via the first one-way clutch 166. Therefore, the pump shaft 158 rotates counterclockwise and lubricating oil is supplied to the discharge oil passage 126 by the oil pump 120. On the other hand, rotation of the second driven gear 172 in the clockwise direction that corresponds to when the vehicle is traveling forward is not transmitted to the pump shaft 158 because the second one-way clutch 170 rotates idly.

Next, a case in which the vehicle travels backward will be described. When the vehicle travels backward, the drive gear 110 rotates counterclockwise. At this time, the first driven gear 168 rotates clockwise. Meanwhile, the idler gear 188 is made to rotate clockwise by the drive gear 110, so the second driven gear 172 that is in mesh with the idler gear 188 rotates counterclockwise. At this time, clockwise rotation of the first driven gear 168 that corresponds to when the vehicle is traveling backward is not transmitted to the pump shaft 158 because the first one-way clutch 166 rotates idly. Meanwhile, counterclockwise rotation of the second driven gear 172 that corresponds to when the vehicle is traveling backward is transmitted to the pump shaft 158 via the second one-way clutch 170. Therefore, the pump shaft 158 rotates counterclockwise and lubricating oil is supplied to the discharge oil passage 126 by the oil pump 120.

Accordingly, when the vehicle travels either forward or backward, the pump shaft 158 rotates counterclockwise and lubricating oil is supplied to the discharge oil passage 126 by the oil pump 120. Also, as shown in FIGS. 5 and 6, the radius of the pitch circle of the second driven gear 172 is designed to be smaller than the radius of the pitch circle of the first driven gear 168, so the reduction gear ratio of the pump shaft 158 with respect to the drive gear 110 is larger with the first driven gear 168. That is, the second driven gear 172 rotates faster than the first driven gear 168 does with respect to the rotation of the drive gear 110. Therefore, the discharge flowrate from the oil pump 120 increases when the vehicle travels backward, such that a sufficient amount of lubricating oil is supplied when the vehicle travels backward at a slow speed in which more lubricating oil is necessary.

As described above, in this example embodiment, when the vehicle travels forward, the oil pump 120 is driven by the first driven gear 168 driving the pump shaft 158 of the oil pump 120 via the first one-way clutch 166. At this time, the second driven gear 172 rotates in the opposite direction of the first driven gear 168, but this rotation is not transmitted to the pump shaft 158 because the second one-way clutch 170 rotates idly. Also, when the vehicle travels backward, the oil pump 120 is driven by the second driven gear 172 driving the pump shaft 158 of the oil pump 120 via the second one-way clutch 170. At this time, the first driven gear 168 rotates in the opposite direction of the second driven gear 172, but this rotation is not transmitted to the pump shaft 158 because the first one-way clutch 166 rotates idly. Here, the second driven gear 172 is in mesh with the drive gear 110 via the idler gear 188, so the rotational direction of the first driven gear 168 when the vehicle travels forward is the same as the rotational direction of the second driven gear 172 when the vehicle travels backward. As a result, the pump shaft 158 of the oil pump 120 rotates in the same direction when the vehicle travels backward as it does when the vehicle travels forward. Therefore, the oil pump 120 is able to pump oil in the same direction regardless of whether the vehicle is traveling forward or backward, so oil can be supplied to portions of the vehicle requiring hydraulic pressure regardless of the direction in which the vehicle is traveling. Also, there is no need for a special switching mechanism or the like that switches the oil passage according to the direction in which the vehicle is traveling and the like, so the apparatus can be simplified, and in turn, the manufacturing cost can be reduced.

Also, according to this example embodiment, the radius of the pitch circle of the second driven gear 172 is designed to be smaller than the radius of the pitch circle of the first driven gear 168, so even if the rotation speed of the drive gear 110 is the same, the rotation speed of the pump shaft 158 is relatively faster, and thus the discharge flowrate from the oil pump 120 is relatively higher, when the vehicle is traveling backward than it is when the vehicle is traveling forward. As a result, oil is able to be effectively supplied when the vehicle is traveling backward at a comparatively low vehicle speed in which lubricating oil is especially necessary.

Also, according to this example embodiment, the face width of the drive gear 110 is greater than the face width of the first driven gear 168 and the face width of the idler gear 188, and both the first driven gear 168 and the idler gear 188 are in mesh with the drive gear 110. As a result, an increase in the number of parts when forming the invention is able to be suppressed.

Also, according to this example embodiment, the drive gear 110, the idler gear 188, and the second driven gear 172 are all arranged such that a triangle is formed when the axis C1 of the drive gear 110, the axis C4 of the idler gear 188, and the axis C2 of the second driven gear 172 are all connected together. Here, a triangle is formed when the axes are connected together refers to the fact that a triangle is formed when the three points of intersection between these three axes and a given plane that is perpendicular to these three axes are connected together. The characteristic of this triangle being formed inhibits the apparatus from expanding in the radial direction compared with when the axes of the drive gear 110, the idler gear 188, and the second driven gear 172 are arranged on a straight line.

Heretofore, an example embodiment of the invention has been described in detail with reference to the drawings, but the invention may also be applied to other modes.

For example, in the example embodiment described above, the first driven gear 168 that transmits power when the vehicle is traveling forward is directly in mesh with the drive gear 110, and the second driven gear 172 that transmits power when the vehicle is traveling backward is in mesh with the drive gear 110 via the idler gear 188. Alternatively, for example, the first driven gear 168 may be in mesh with the drive gear 110 via the idler gear 188, and the second driven gear 172 may be directly in mesh with the drive gear 110.

Also, in the example embodiment described above, the oil pump 120 is used in an FF type electric vehicle, but it is not necessarily limited to being used in the electric vehicle. For example, the oil pump 120 may also be used in a hybrid vehicle or the like. That is, the invention may be suitably used as long as the structure is one that drives the oil pump using a rotating member that reverses its rotational direction according to the direction in which the vehicle is traveling, i.e., that rotates in one direction when the vehicle travels forward and rotates in the opposite direction when the vehicle travels backward.

Also, in the example embodiment described above, the first driven gear 168 and the pump shaft 158 are connected via the first one-way clutch 166 when the vehicle travels forward, and the second driven gear 172 and the pump shaft 158 are connected via the second one-way clutch 170 when the vehicle travels backward. Alternatively, however, the first driven gear 168 and the pump shaft 158 may be connected via the first one-way clutch 166 when the vehicle travels backward, and the second driven gear 172 and the pump shaft 158 may be connected via the second one-way clutch 170 when the vehicle travels forward. Incidentally, in this case, the oil pump 120 may be configured to discharge lubricating oil to the discharge oil passage 126 by the rotation of the second driven gear 172 when the vehicle travels forward, and discharge lubricating oil to the discharge oil passage 126 by the rotation of the first driven gear 168 when the vehicle travels backward.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle oil pump that is driven by a drive gear provided on a rotating shaft that rotates in one direction when a vehicle travels forward and rotates in the opposite direction when the vehicle travel backward, comprising:
   a first driven gear that is in mesh with the drive gear and provided on a drive shaft of the vehicle oil pump via a first one-way clutch;
   an idler gear that is in mesh with the drive gear; and
   a second driven gear that is in mesh with the idler gear and provided on the drive shaft of the vehicle oil pump via a second one-way clutch,
   wherein the first one-way clutch is configured to transmit rotation of the first driven gear to the drive shaft when the vehicle travels in one direction, from among forward and backward, and the second one-way clutch is configured to transmit rotation of the second driven gear to the drive shaft when the vehicle travels in the other direction, from among forward and backward.

2. The vehicle oil pump according to claim 1, wherein the first one-way clutch is configured to transmit the rotation of the first driven gear to the drive shaft when the vehicle travels forward; the second one-way clutch is configured to transmit the rotation of the second driven gear to the drive shaft when the vehicle travels backward; and a radius of a pitch circle of the second driven gear is designed to be smaller than the radius of the pitch circle of the first driven gear.

3. The vehicle oil pump according to claim 1, wherein a face width of the drive gear is larger than the face width of the first driven gear and the face width of the idler gear, and the first driven gear and the idler gear are in mesh with the drive gear.

4. The vehicle oil pump according to claim 3, wherein the face width of the drive gear is larger than the sum of the face width of the first driven gear and the face width of the idler gear.

5. The vehicle oil pump according to claim 1, wherein the drive gear, the idler gear, and the second driven gear are arranged such that a triangle is formed when an axis of the drive gear, an axis of the idler gear, and an axis of the second driven gear are connected together.

* * * * *